H. CREHAN.
BOLT THREADING MACHINE.
APPLICATION FILED JUNE 5, 1917.
1,327,312.
Patented Jan. 6, 1920.
5 SHEETS—SHEET 3.
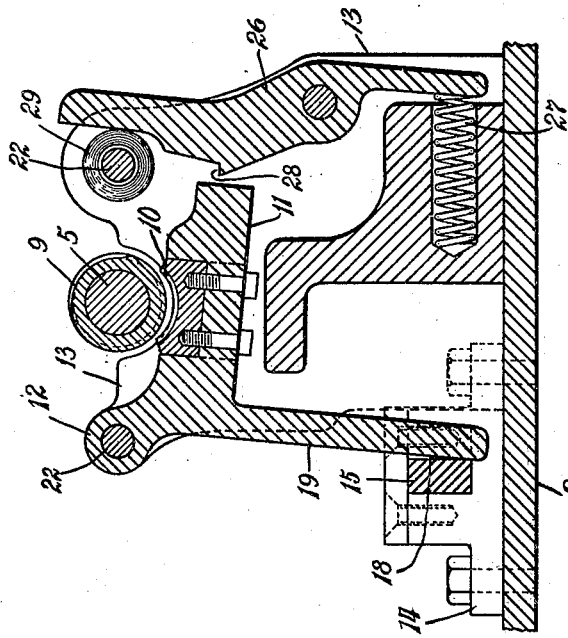
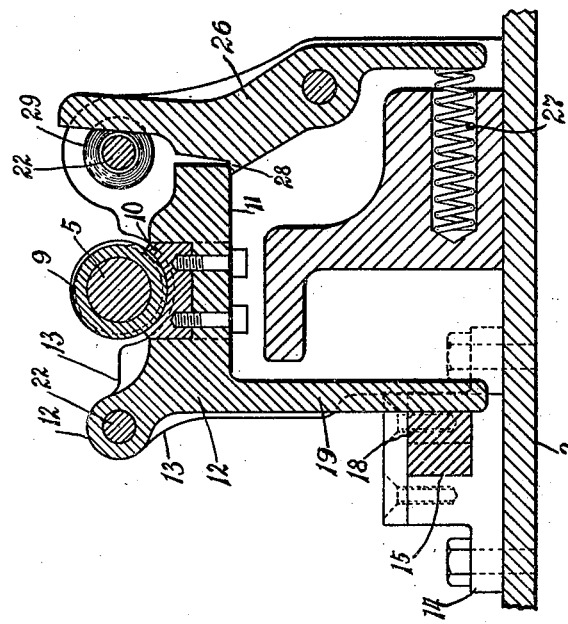

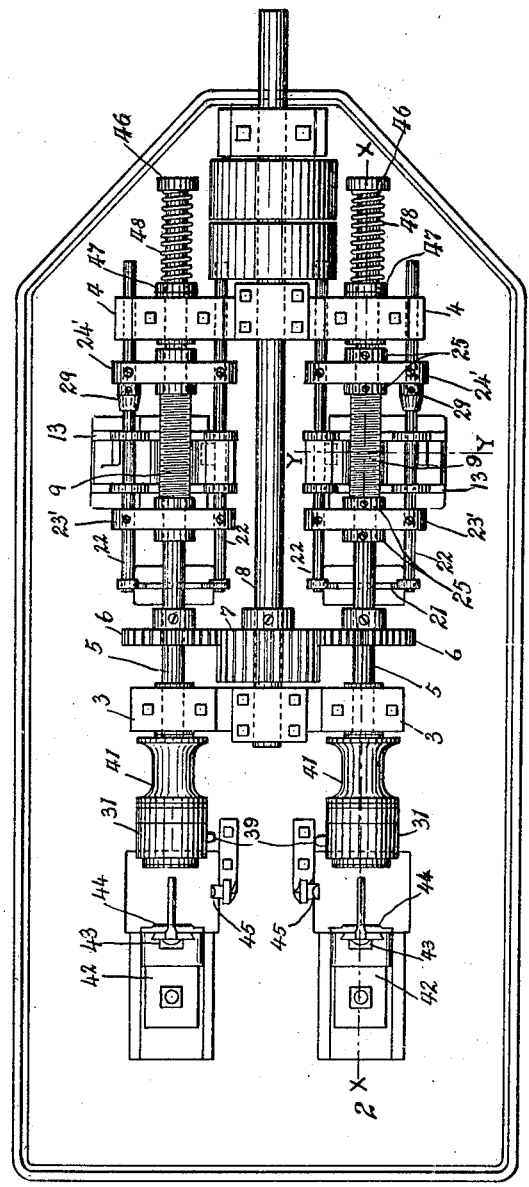

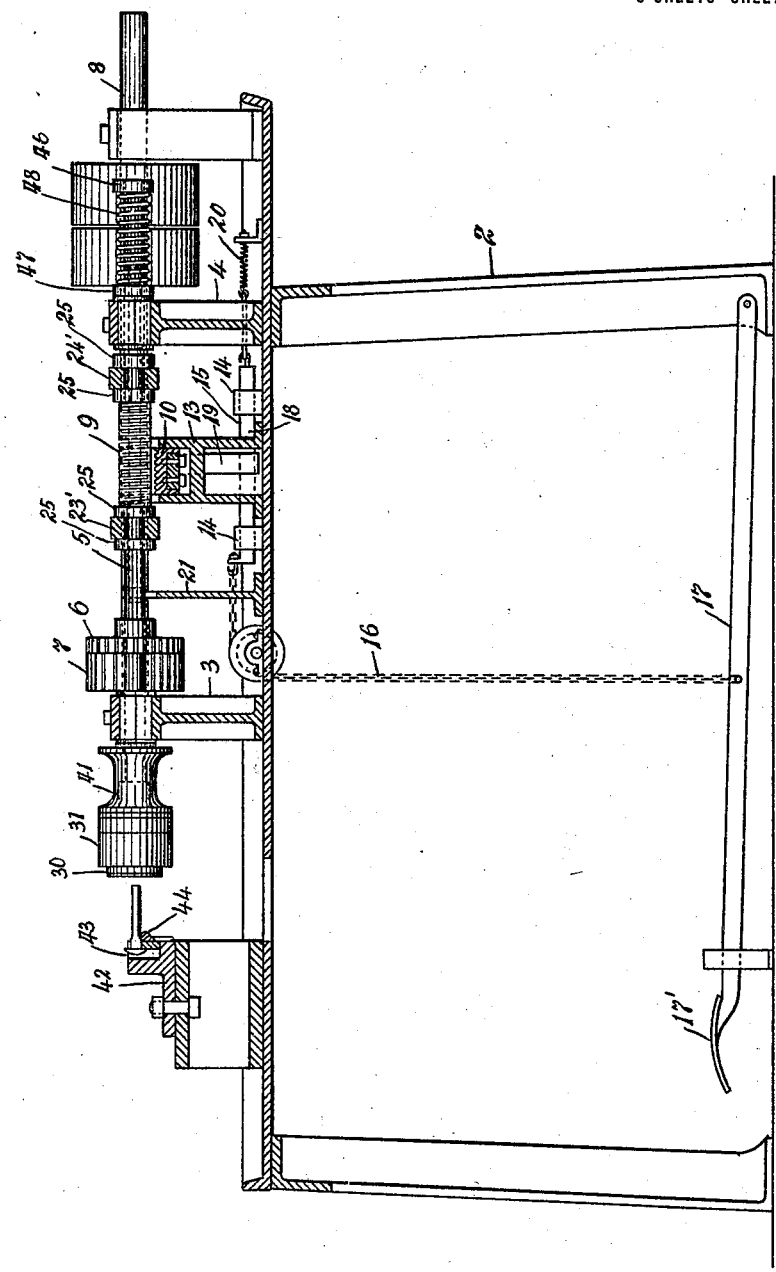

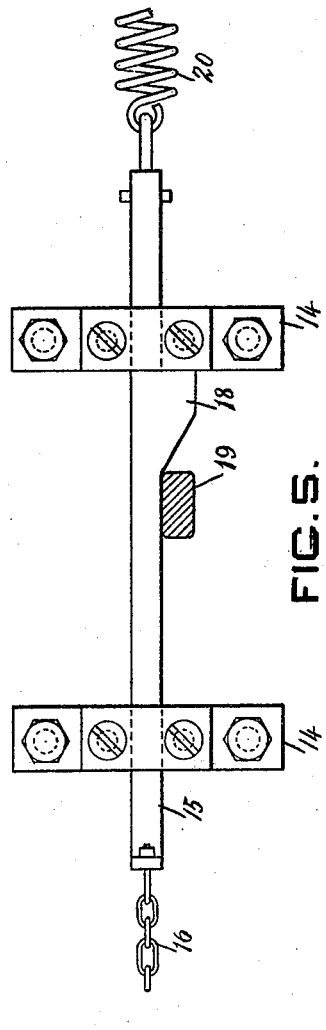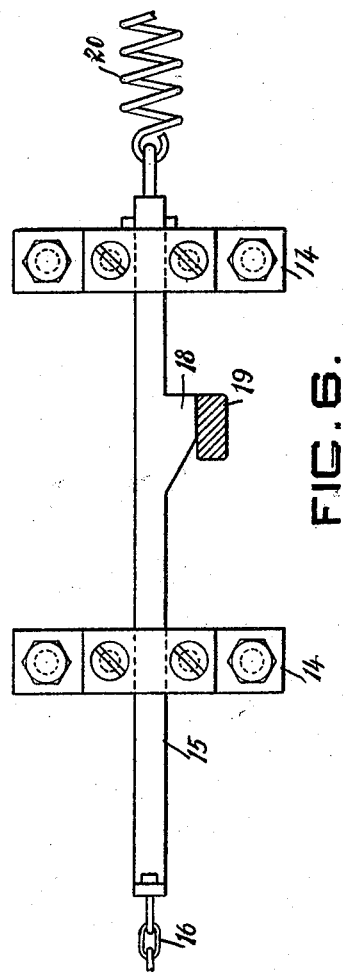

H. CREHAN.
BOLT THREADING MACHINE.
APPLICATION FILED JUNE 5, 1917.
1,327,312.
Patented Jan. 6, 1920.
5 SHEETS—SHEET 5.
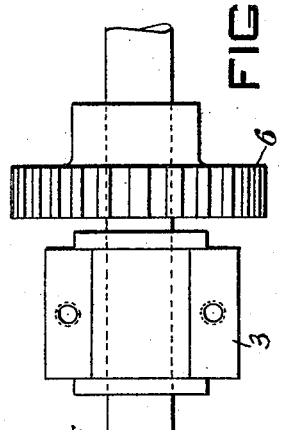
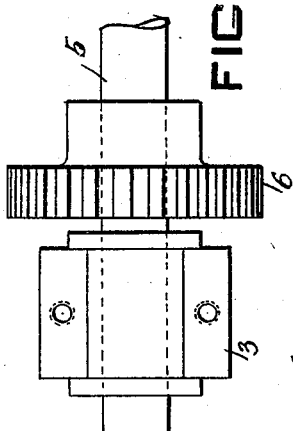
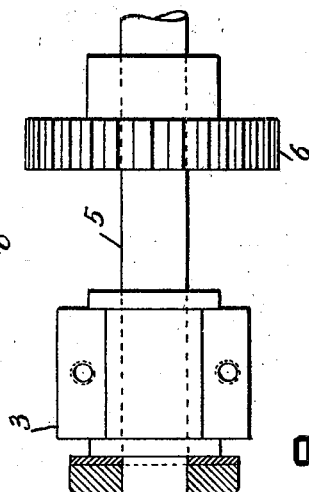
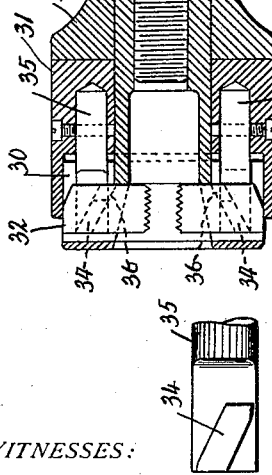
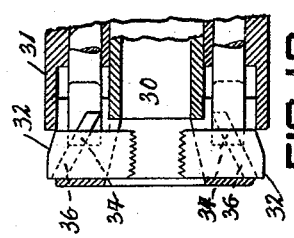
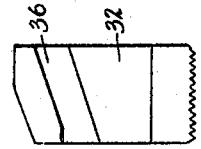
WITNESSES:
INVENTOR.
Hubert Crehan
BY
ATTORNEY.

UNITED STATES PATENT OFFICE.

HUBERT CREHAN, OF PITTSBURGH, PENNSYLVANIA.

BOLT-THREADING MACHINE.

1,327,312.  Specification of Letters Patent.  Patented Jan. 6, 1920.

Application filed June 5, 1917. Serial No. 172,882.

*To all whom it may concern:*

Be it known that I, HUBERT CREHAN, of Pittsburgh, in the county of Allegheny and State of Pennsylvania, have invented a new and useful Improvement in Bolt-Threading Machines, of which the following is a full, clear, and exact description, reference being had to the accompanying drawings, forming part of this specification in which—

Figure 1 is a plan view of a bolt-threading machine illustrating my invention; Fig. 2 is a longitudinal vertical view partly in section on the line $x$—$x$ of Fig. 1; Figs. 3 and 4 are cross vertical sectional views on the line $y$—$y$ of Fig. 1; Figs. 5 and 6 are detached views of the starting bar; Figs. 7, 8, and 9 are sectional views of the die holding chuck; and Figs. 10, 11, 12 and 13 are views of portions of the die operating mechanism.

In the drawings 2 represents the frame of the machine, on which are mounted journal bearing standards, 3 and 4, provided with suitable journal boxes or bearings in which the spindle, 5, is journaled, keyed to which spindle is the gear wheel, 6, which meshes with the gear wheel, 7, on the power shaft, 8. Formed on the outer circumference of the spindle, 5, is the lead-screw, 9, and below this screw is the threaded nut-segment, 10, which is fixed in the horizontal arm, 11, of the bell crank lever, 12, which is pivoted in the standards, 13. Mounted in slide bearings, 14, on the frame, 2, is the starting bar, 15, which is connected by a chain, 16, with the foot-treadle, 17, and on one side face of the bar is the cam, 18, which is arranged to be brought in contact with the vertically depending arm, 19, of the bell crank lever, 12, to move the same and throw the nut-segment, 10, into mesh with the lead-screw, 9, on the spindle, 5. At the rear end of the bar, 15, is a retracting spring, 20. Fitting loosely in vertical posts, 21, are rods, 22, which rods fit loosely also in the standard, 4, and keyed to the rods are cross pieces, 23' and 24', the cross pieces being provided with openings in which the spindle, 5, revolves loosely, and on the spindle and keyed thereto are the collars, 25, on each side of the cross pieces, whereby the spindle, 5, is free to rotate in the cross pieces and to carry them and the rods, 22, with it in its longitudinal movement imparted by the segmental nut 10. Pivoted to the standards, 13, on the opposite side of the spindle from the lever 12, is a locking lever, 26, the lower arm of which is provided with a spring, 27, the force of which tends to press the upper arm of the locking lever toward the arm, 11, of the lever 12, on which upper arm is a ledge, 28, which is adapted to engage with and support the lower corner of the arm 11, when it is in its elevated position, to retain the nut, 10, in contact with the lead-screw 9. Keyed to the rod, 22, is a cone-shaped member, 29, which by the forward movement of the spindle is brought in contact with the upper arm of the locking lever, 26, to retract the same and release the arm, 11, of the lever, 12, which allows the nut, 10, to drop away from the lead-screw, 9.

On the forward end of the spindle, 5, is a head or chuck which consists essentially of an inner portion, 30, fixed to the end of the spindle, an outer collar, 31, adapted to slide on the inner part, 30, it being connected with the inner part by the feather and spline, 33, and movable sectional die-bits, 32, which fit within the mouth of the chuck and are moved toward and away from each other by lugs, 34, on the pins, 35, which are fixed to the collar, 31, the lugs fitting movably in the inclined slots, 36, in the bits, 32. Fitting in a cavity in the part 30 of the chuck is a spring latch, 37, adapted to so engage with a keeper, 38, which is secured to the collar 31, as to connect the part 30 and the collar 31 with each other. Within the keeper, 38, is a push-bolt, 39, which bears on the latch, 37, and by pressure exerted on the bolt the latch is depressed and the two parts, 30 and 31, are disconnected to permit the collar, 31, to slide on the part 30 to open the die-bits, the extent of this sliding movement being limited by the feather and spline, 33. Within cavities in the parts 30 and 31 is a spiral spring, 40, the force of which tends to keep the collar, 31, retracted on the part 30. Slidably mounted on the spindle, 5, is a collar, 41, which when the spindle is fully retracted comes in contact with the standard, 3, and, by the blow under the force of the retracting spring, 48, the collar 31 is caused to slide on the part, 30, to close the die-bits by the movement of the lugs, 34, in the inclined slots, 36, and the latch, 37, to engage with the keeper, 38, to retain the die-bits in their closed position ready to cut a thread on a bolt when the spindle is caused to again move forward.

At the forward end of the frame, 2, is the bolt holder, 42, having a recess to receive the head of the bolt, 43, to support the bolt in position to enter the chuck between the die-bits. On the outer face of the bolt holder is a rounded rib, 44, which serves to throw the head of the bolt clear of the holder as the bolt drops therefrom. At one side of the bolt holder in the path of the push bolt, 39, is a cam, 45, which is arranged to engage with the push bolt to depress the same, as soon as the threading of the bolt is complete, to disconnect the collar, 31, from the part, 30; whereupon the collar is retracted by the spring, 40, which causes the die-bits to separate to release the bolt which has been threaded. On the rear end of the spindle, 5, is a head, 46, between which and the loose collar, 47, is a spring, 48, which serves to retract the spindle as soon as it is released from the nut 10.

The operation is as follows:—Power having been applied to the shaft 8, and a bolt having been placed in the holder, the operator depresses the treadle, 17, which throws the nut, 10, into engagement with the lead-screw, 9, and causes the spindle to move forward and the die to come in contact with the bolt in the holder to thread the same. As the threading operation is complete, the push bolt, 39, comes in contact with the cam, 45, which unlatches the collar, 31, permitting it to be retracted to open the die-bits, and the conical nut, 29, coming in contact with the upper arm of the locking lever, 26, retracts the same, which allows the nut, 10, to drop away from the lead-screw, 9, and the spindle, 5, to be retracted by the spring, 48, the die-bits being again closed by the collar, 41, coming in contact with the standard, 3.

In the drawings two machines are shown mounted on a single frame, but I do not desire to limit myself to this arrangement. From the foregoing description the advantages of my invention should be appreciated by those skilled in the art.

Having thus described my invention, what I claim and desire to secure by Letters Patent is

In a machine for threading bolts, the combination of a rotary spindle, devices for imparting a longitudinal movement to the spindle, a die, a bolt-holder having a cavity for the reception of the head of the bolt, and a rib on the face of the bolt-holder to throw the head of the bolt out of the cavity.

In testimony whereof I have hereunto set my hand.

HUBERT CREHAN.

Witnesses:
JAMES N. BAKEWELL,
SUE B. FRITZ.